US 11,158,083 B2

(12) United States Patent
Lin et al.

(10) Patent No.: US 11,158,083 B2
(45) Date of Patent: Oct. 26, 2021

(54) POSITION AND ATTITUDE DETERMINING METHOD AND APPARATUS, SMART DEVICE, AND STORAGE MEDIUM

(71) Applicant: TENCENT TECHNOLOGY (SHENZHEN) COMPANY LIMITED, Shenzhen (CN)

(72) Inventors: Xiangkai Lin, Shenzhen (CN); Liang Qiao, Shenzhen (CN); Fengming Zhu, Shenzhen (CN); Yu Zuo, Shenzhen (CN); Zeyu Yang, Shenzhen (CN); Yonggen Ling, Shenzhen (CN); Linchao Bao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/917,069

(22) Filed: Jun. 30, 2020

(65) Prior Publication Data
US 2020/0334854 A1 Oct. 22, 2020

Related U.S. Application Data

(63) Continuation of application No. PCT/CN2019/079341, filed on Mar. 22, 2019.

(30) Foreign Application Priority Data

Apr. 27, 2018 (CN) .......................... 201810392212.7

(51) Int. Cl.
G06T 7/73 (2017.01)
G06T 7/50 (2017.01)
(Continued)

(52) U.S. Cl.
CPC .............. G06T 7/74 (2017.01); G06T 3/4007 (2013.01); G06T 7/248 (2017.01); G06T 7/50 (2017.01); G06T 2207/10028 (2013.01)

(58) Field of Classification Search
CPC .. G06T 7/74; G06T 7/50; G06T 7/248; G06T 3/4007; G06T 2007/10028; G06T 7/73
See application file for complete search history.

(56) References Cited

U.S. PATENT DOCUMENTS

2006/0120606 A1* 6/2006 Furuhashi ................ G06T 7/55
382/190
2008/0267454 A1* 10/2008 Kobayashi ......... G06K 9/00201
382/106
(Continued)

FOREIGN PATENT DOCUMENTS

CN 102819845 A 12/2012
CN 104050475 A 9/2014
(Continued)

OTHER PUBLICATIONS

The World Intellectual Property Organization (WIPO) International Search Report for PCT/CN2019/079341 dated Jun. 26, 2019 5 Pages (including translation).
(Continued)

Primary Examiner — Dhaval V Patel
(74) Attorney, Agent, or Firm — Anova Law Group, PLLC

(57) ABSTRACT

Embodiments of this application disclose a position and attitude determining method. The method includes acquiring, by tracking a feature point of a first marked image, position and attitude parameters of an image captured by a camera; using a previous image of a first image as a second marked image in response to the previous image of the first image meeting a feature point tracking condition and the first image failing to meet the feature point tracking condi-
(Continued)

tion; acquiring, position and attitude parameters of the image captured by the camera relative to the second marked image; acquiring position and attitude parameters according to the position and attitude parameters of the image relative to the second marked image and position and attitude parameters of each marked image relative to a previous marked image; and determining a position and an attitude of the camera according to the position and attitude parameters.

20 Claims, 7 Drawing Sheets

(51) Int. Cl.
  *G06T 7/246* (2017.01)
  *G06T 3/40* (2006.01)

(56) References Cited

U.S. PATENT DOCUMENTS

| | | | | |
|---|---|---|---|---|
| 2008/0285854 | A1* | 11/2008 | Kotake | G06T 7/73 382/190 |
| 2010/0232727 | A1 | 9/2010 | Engedal | |
| 2015/0235378 | A1 | 8/2015 | Rhee et al. | |
| 2016/0379375 | A1* | 12/2016 | Lu | G06K 9/00664 382/103 |
| 2019/0206115 | A1 | 7/2019 | Tytgat et al. | |

FOREIGN PATENT DOCUMENTS

| | | |
|---|---|---|
| CN | 105184822 A | 12/2015 |
| CN | 105931275 A | 9/2016 |
| CN | 106920259 A | 7/2017 |
| CN | 108537845 A | 9/2018 |
| EP | 3264372 A1 | 1/2018 |
| WO | 2017027338 A1 | 2/2017 |

OTHER PUBLICATIONS

Georg Klein et al., "Parallel Tracking and Mapping for Small AR Workspaces". ISMAR 2007. 10 Pages.
Raul Mur-Artal et al., "ORB-SLAM: A Versatile and Accurate Monocular SLAM System". IEEE Transactions on Robotics 2015 17 Pages.
Christian Forster et al., "SVO: Fast Semi-Direct Monocular Visual Odometry". ICRA 2014. 8 Pages.
Jakob Engel et al., "LSD-SLAM: Large-Scale Direct Monocular SLAM". ECCV 2014. 16 Pages.
Edward Rosten et al., "Machine learning for high-speed corner detection". ECCV 2006. 14 Pages.
Chris Harris et al., "A combined corner and edge detector." Alvey vision conference. vol. 15. No. 50. 1988. 5 Pages.
Jianbo Shi et al., "Good features to track", IEEE Conference on Computer Vision and Pattern Recognition, Jun. 1994 8 Pages.
Vincent Lepetit et al., "EPnP: An Accurate O(n) Solution to the PnP Problem". International Journal of Computer Vision, 2009, 81 (2): 155-166 12 Pages.
Bruce D. Lucas et al., "An iterative image registration technique with an application to stereo vision," Proceedings of the 7th international joint conference on Artificial intelligence, Aug. 1981, pp. 674-679. 5 Pages.
The State Intellectual Property Office of the People's Republic of China (SIPO) Office Action 1 for 2018103922121 dated Apr. 22, 2021 11 Pages (including translation).

* cited by examiner

POSITION AND ATTITUDE DETERMINING METHOD AND APPARATUS, SMART DEVICE, AND STORAGE MEDIUM

RELATED APPLICATIONS

This application claims priority to PCT Application No. PCT/CN2019/079341, which claims priority to Chinese Patent Application No. 2018/10392212.7, entitled "POSITION AND ATTITUDE DETERMINING METHOD AND APPARATUS, AND STORAGE MEDIUM" filed on Apr. 27, 2018, which are both incorporated by reference in their entirety.

FIELD OF THE TECHNOLOGY

Embodiments of this application relate to the field of computer technologies, and in particular, to a position and attitude determining method and apparatus, a smart device, and a storage medium.

BACKGROUND OF THE DISCLOSURE

Augmented reality (AR) technology is a technology for tracking a position and an attitude of a camera in real time and displaying the position and attitude in combination with a virtual image, video, or three-dimensional model, and may display a virtual scene in combination with an actual scene. Augmented reality is an important research direction in a current computer vision field. One of the issues in the AR technology is how to accurately determine the position and attitude of the camera.

The method for determining the position and attitude of the camera by tracking a feature point in a marker image often includes the following: a marker image is determined in advance, a feature point is extracted in the marker image, the extracted feature point is tracked with a change in the position or attitude of the camera, and every time when one image is currently captured by the camera, the feature point in the marker image is recognized in the current image, so that a position and an attitude of the feature point in the current image is compared with a position and an attitude of the feature point in the marker image to obtain position and attitude parameters of the feature point, further obtaining position and attitude parameters of the current image relative to the marker image, such as a rotation parameter and a translation parameter. The position and attitude parameters may represent the position and the attitude of the camera when capturing of the current image.

However, in the method describe above when the position or attitude of the camera is changed significantly, to the point that no feature point exists in the current image, the feature point cannot be tracked, and then the position and attitude of the camera cannot be determined.

SUMMARY

Embodiments of this application provide a position and attitude determining method and apparatus, a smart device, and a storage medium to resolve a problem in related technologies. The technical solutions are as follows:

One aspect of this application provides a position and attitude determining method. The method includes acquiring, by tracking a feature point of a first marked image, position and attitude parameters of an image captured by a camera; using a previous image of a first image as a second marked image in response to the previous image of the first image meeting a feature point tracking condition and the first image failing to meet the feature point tracking condition; acquiring, by tracking a feature point of the second marked image, position and attitude parameters of the image captured by the camera relative to the second marked image; acquiring position and attitude parameters of the image according to the position and attitude parameters of the image relative to the second marked image and position and attitude parameters of each marked image relative to a previous marked image; and determining a position and an attitude of the camera according to the position and attitude parameters.

Another aspect of the present application provides non-transitory computer readable storage medium. The computer readable storage medium storing a computer program that, when being loaded by a processor, cause the processor to acquire, by tracking a feature point of a first marked image, position and attitude parameters of an image captured by a camera; use a previous image of a first image as a second marked image when the previous image of the first image meets a feature point tracking condition and the first image fails to meet the feature point tracking condition; and acquire, by tracking a feature point of the second marked image, position and attitude parameters of the image captured by the camera relative to the second marked image; and acquire position and attitude parameters of the image according to the position and attitude parameters of the image relative to the second marked image and position and attitude parameters of each marked image relative to a previous marked image, and determine a position and an attitude of the camera according to the position and attitude parameters.

Another aspect of the present application provides a smart device. The smart device includes a processor and a memory, the memory storing one or more computer readable instructions. The computer readable instructions, when executed by the processor, implement following operations: acquiring, by tracking a feature point of a first marked image, position and attitude parameters of an image captured by a camera; using a previous image of a first image as a second marked image when the previous image of the first image meets a feature point tracking condition and the first image fails to meet the feature point tracking condition; acquiring, by tracking a feature point of the second marked image, position and attitude parameters of the image captured by the camera relative to the second marked image; and acquiring position and attitude parameters of the image according to the position and attitude parameters of the image relative to the second marked image and position and attitude parameters of each marked image relative to a previous marked image, and determining a position and an attitude of the camera according to the position and attitude parameters.

In the method, apparatus, smart device, and storage medium according to the embodiment of this application, during tracking of a feature point of the first marked image and acquisition of the position and attitude parameters of the image captured by the camera, when the previous image of the first image meets the feature point tracking condition but the first image fails to meet the feature point tracking condition, the previous image of the first image is used as the second marked image. Afterwards, the feature point of the second marked image is tracked, the position and attitude parameters of the image are acquired according to the position and attitude parameters of the image captured by the camera relative to the second marked image and the position and attitude parameters of each marked image relative to the previous marked image, and the position and attitude of the camera are determined according to the position and attitude parameters. A marked image is switched when the first image fails to meet the feature point tracking condition, and the position and attitude of the camera are determined by tracking a feature point of a new marked image after switch, preventing a failure of tracking the feature point due to excessive changes in the position or attitude of the camera, increasing robustness and improving tracking accuracy of the camera.

In addition, no marked image is needed to be preset, and a current scene is only needed to be captured to obtain one image that is determined as the initial marked image, so that the marked image may be initialized, getting rid of a limitation of presetting of the marked image and expanding an application scope.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

The following clearly and completely describes the technical solutions in the embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application without creative efforts shall fall within the protection scope of this application.

An embodiment of this application provides a position and attitude determining method applied to a scene in which a smart device tracks a position and an attitude of a camera, especially in an AR scene. When a smart device uses an AR technology for display, such as display of an AR game or an AR video, etc., the position and the attitude of the camera needs to be tracked.

A camera and a display unit are configured for the smart device. The camera is configured to capture an image of a real scene, and the display unit is configured to display a scene interface formed by combining the real scene with a virtual scene. As the camera is moved, the smart device may track changes in the position and attitude of the camera, and may further capture an image of the real scene, and display a plurality of currently captured images in sequence according to the changes in the position and attitude of the camera, thereby simulating an effect of displaying a three-dimensional interface. In addition, a virtual element may be added to a displayed image, such as a virtual image, a virtual video, or a virtual three-dimensional model, etc. As the camera is moved, the virtual element may be displayed in different manners according to changes in the position and attitude of the camera, thereby simulating an effect of displaying a three-dimensional virtual element. The image of the real scene is combined with the virtual element for display to form the scene interface, so that an effect that the real scene and the virtual element are in the same three-dimensional space.

Figure 1:
FIG. 1 is a schematic display diagram of one scene interface according to an embodiment of this application.
Figure 2:
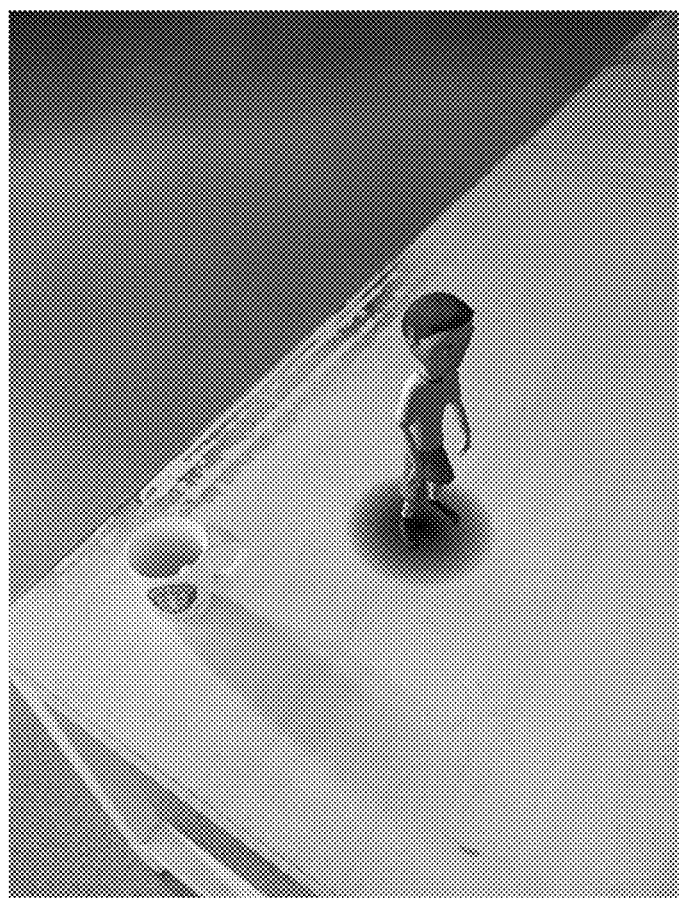
FIG. 2 is a schematic display diagram of the other scene interface according to an embodiment of this application.

For example, referring to both FIG. 1 and FIG. 2, the smart device adds a virtual character to a captured image including a table and a tea cup. As the camera is moved, the captured image is changed, and a capture orientation of the virtual character is also changed, simulating an effect that the virtual character is stationary in the image relative to the table and the tea cup, and the camera simultaneously captures, with the changes in the position and attitude, the table, the tea cup, and the virtual character, presenting the user with a real three-dimensional picture.

Figure 3:
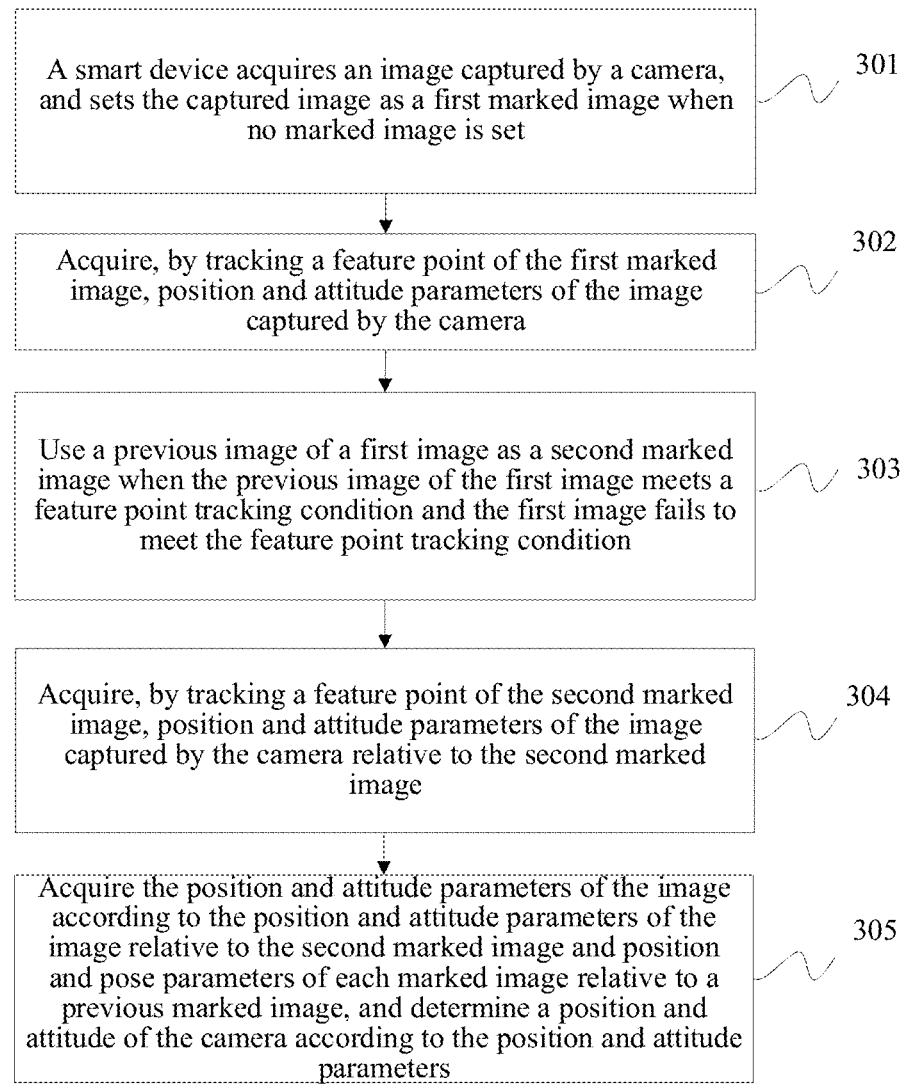
FIG. 3 is a flow chart of a position and attitude determining method according to an embodiment of this application.

FIG. 3 is a flow chart of a position and attitude determining method according to an embodiment of this application. The position and attitude determining method is performed by a smart device. The smart device may be a terminal such as a mobile phone or a tablet computer equipped with a camera, or an AR device such as AR glasses or an AR helmet equipped with a camera. Referring to FIG. 3, the method includes the following.

301. A smart device acquires an image captured by a camera, and sets the captured image as a first marked image when no marked image is set. In this case, the first marked image is an initial marked image.

In an embodiment of this application, in order to track changes in a position and an attitude of the camera, the marked image needs to be used as a reference. During capturing of at least one image by the camera, position and attitude parameters of the camera are determined by tracking a feature point of the marked image.

Accordingly, when no marked image is set, the smart device may capture a third image through the camera, acquire an image currently captured by the camera, and set the image as the first marked image to achieve initialization of the marked image. In a subsequent process in which the smart device continues to capture other images, position and attitude parameters of each image may be acquired by tracking a feature point of the first marked image.

The camera may perform photographing in a preset period. An image is captured every other preset period. The preset period may be 0.1 second or 0.01 second.

In some embodiments, in order to prevent a few number of feature points in the first marked image and causing a tracking failure, after a captured image is acquired, the feature points may be extracted from the image to determine whether the number of extracted feature points reaches a preset number. When the number of feature points extracted from the image reaches the preset number, the image is set as the first marked image. When the number of feature points extracted from the image fails to reach the preset number, the image may not be set as the first marked image, but a next image captured by the camera may be acquired until the number of the extracted feature points reaches a preset number of images, the image whose number of the extracted feature points reaches the preset number is set as the first marked image.

A feature extraction algorithm used during extraction of the feature points may be a features from accelerated segment test (FAST) detection algorithm, a Shi-Tomasi corner detection algorithm, and a Harris corner detection algorithms, etc. The preset number may be determined according to a demand for track accuracy.

First, in the embodiment of this application, the marked image may be switched as the camera is moved. In order to unify a measurement standard and accurately determine the changes in the position and the attitude of the camera, the initial marked image is used as a reference. Position and attitude parameters of each image relative to the initial marked image may be used as position and attitude parameters of a corresponding image. The position and attitude parameters are used for representing the position and the attitude of the camera during capturing of the corresponding image.

Second, in the embodiment of this application, for example, the first marked image is used as the initial marked image. Actually, the first marked image may also be a marked image set after the initial marked image. In other words, in another example, the smart device may further set other marked images before the first marked image. After switching once or several times, the smart device switches to the first marked image. A specific switch process is similar to a process of switching from the first marked image to a second marked image below, and the details thereof are not described herein again.

302. Acquire, by tracking a feature point of the first marked image, position and attitude parameters of the image captured by the camera.

After the first marked image is determined, a feature point extracted from the first marked image is used as a to-be-tracked target feature point. With changes in the position or attitude of the camera, the smart device captures at least one image through the camera, and tracks a feature point in the at least one image to obtain position and attitude parameters of each image relative to a previous image.

For two adjacent images captured by the camera, a feature point of the first marked image extracted from the previous image is used to perform optical flow, so as to find a matching feature point between the previous image and the next image, and obtain optical flow information of the matching feature point. The optical flow information is used for representing movement information of the matching feature point in the two adjacent images. Therefore, position and attitude parameters of a second image relative to a first image in two adjacent images may be determined according to the optical flow information of the matching feature point. An algorithm used for the optical flow may be a Lucas-Kanade optical flow algorithm or other algorithms. In addition to the optical flow, a descriptor or a direct method may be further used for matching the feature point to find the matching feature point between the previous image and the next image.

Then, for any image captured by the camera after the first marked image, position and attitude parameters of each of the first marked image to the image relative to a previous image are acquired. Iteration may be performed according to the position and attitude parameters of each image relative to the previous image, so that position and attitude parameters of the image relative to the first marked image are determined. The position and attitude parameters may include a translation parameter and a rotation parameter. The translation parameter is used for representing a distance between a position at which the camera captures the image and a position at which the camera captures the first marked image. The rotation parameter is used for representing an angle difference between a rotation angle at which the camera captures the image and a rotation angle at which the camera captures the first marked image.

For example, starting from the first marked image, the camera successively captures an image 1, an image 2, and an image 3, and position and attitude parameters (R1, T1) of the image 1 relative to the first marked image, position and attitude parameters (R2, T2) of the image 2 relative to the image 1, and position and attitude parameters (R3, T3) of the image 3 relative to the image 2 are acquired. Therefore, iteration may be performed according to the position and attitude parameters, and position and attitude parameters (R3', T3') of the image 3 relative to the first marked image are determined as the following:

$$\begin{bmatrix} R3' & T3' \\ 0 & 1 \end{bmatrix} = \begin{bmatrix} R1 & T1 \\ 0 & 1 \end{bmatrix} * \begin{bmatrix} R2 & T2 \\ 0 & 1 \end{bmatrix} * \begin{bmatrix} R3 & T3 \\ 0 & 1 \end{bmatrix}.$$

During tracking of the feature point, with the changes in the position and the attitude of the camera, a number of feature points in a captured image may be reduced, resulting in that some feature points in the previous image do not have matching feature points in the next image. When feature points included in two adjacent images are matched, some mismatched feature points are excluded.

In addition, the smart device may further check an optical flow matching result to exclude an unreasonable feature point. In other words, for any image captured by the camera after the first marked image, according to three-dimensional coordinates of a plurality of feature points in the first marked image and position and attitude parameters of the image relative to the first marked image, changes in a position and an attitude of a feature point are simulated, estimated three-dimensional coordinates of each feature point in the image are calculated, and the estimated three-dimensional coordinates of each feature point in the image are calculated to obtain estimated two-dimensional coordinates of each feature point in the image, and the estimated two-dimensional coordinates of each feature point in the image are compared with actual two-dimensional coordinates to acquire a distance between the estimated two-dimensional coordinates of each feature point in the image and the actual two-dimensional coordinates of each feature point in the image. When the distance between the estimated two-dimensional coordinates of each feature point in the image and the actual two-dimensional coordinates of each feature point in the image is greater than a preset distance, it indicates that a change in the attitude of the camera starting from the first marked image is simulated according to calculated position and attitude parameters, an obtained position of the feature point is significantly different from an actual position. It may be deemed that changes in the position and attitude of the feature point does not conform to a due rotation and translation relationship, and a great error is caused. Therefore, the feature point is deleted in order to prevent the feature point from affecting subsequent tracking.

In the embodiment of this application, the first marked image is the initial marked image. The position and attitude parameters of the image relative to the first marked image may represent a position and an attitude of a camera during capturing of the image.

In another embodiment, when the first marked image is not the initial marked image, position and attitude parameters of the image relative to the initial marked image are acquired according to position and attitude parameters of the image relative to the first marked image and position and attitude parameters of the image relative to the initial marked image. The position and attitude parameters may represent the position and the attitude of the camera during capturing of the image.

In some embodiments, according to the position and attitude parameters of the first marked image relative to the initial marked image and the position and attitude parameters of the image relative to the first marked image, the position and attitude parameters of the image are acquired in the following formula:

$$\begin{bmatrix} R\_final & T\_final \\ 0 & 1 \end{bmatrix} = \begin{bmatrix} Rca & Tca \\ 0 & 1 \end{bmatrix} * \begin{bmatrix} R\_old & T\_old \\ 0 & 1 \end{bmatrix};$$

R_final representing a rotation parameter of the image, and T_final representing a translation parameter of the image; Rca representing a rotation parameter of the image relative to the first marked image, and Tca representing a translation parameter of the image relative to the first marked image; and R_old representing a rotation parameter of the first marked image relative to the initial marked image, and T_old representing a translation parameter of the first marked image relative to the initial marked image.

First, during the tracking, three-dimensional coordinates of the feature point need to be determined, and then changes in the position and attitude of the camera in a three-dimensional space may be determined by tracking the feature point. Accordingly, during extraction of the feature point in the first marked image, after two-dimensional coordinates of the feature point in the first marked image are determined, homogeneous coordinates corresponding to the two-dimensional coordinates of the feature point are acquired. The homogeneous coordinates are used for representing the two-dimensional coordinates in a three-dimensional form. The homogeneous coordinates are transformed into corresponding three-dimensional coordinates in the following coordinate transformation relationship:

$$M = s * \begin{bmatrix} \frac{1}{fx} & 0 & -\frac{cx}{fx} \\ 0 & \frac{1}{fy} & -\frac{cy}{fy} \\ 0 & 0 & 1 \end{bmatrix} * m;$$

M representing the three-dimensional coordinates, m representing the homogeneous coordinates, s representing a depth of a marked image at which the feature point is located, and fx, fy, cx, and cy representing parameters of the camera.

For example, the homogeneous coordinates of the feature point may be [μ, v, 1], and then the three-dimensional coordinates of the feature point may be $$M = s * \begin{bmatrix} \frac{1}{fx} & 0 & -\frac{cx}{fx} \\ 0 & \frac{1}{fy} & -\frac{cy}{fy} \\ 0 & 0 & 1 \end{bmatrix} * \begin{bmatrix} \mu \\ v \\ 1 \end{bmatrix}.$$

Second, during tracking of each independent marked image, it is assumed that depths of all three-dimensional feature points at the marked image are s. In an actual application, the smart device may determine the marked image, the three-dimensional coordinates of the feature point, and the depth of the marked image, and calculate the parameters by using a perspective-n-point (PnP) algorithm to obtain the position and attitude parameters of the camera. The PnP algorithm may be direct linear transformation, P3P, ePnP, and uPnP, etc., or the parameters may be also calculated by using an algorithm other than the PnP algorithm, such as a bundle adjustment (BA) to optimize the PnP algorithm.

303. Use a previous image of a first image as a second marked image when the previous image of the first image meets a feature point tracking condition and the first image fails to meet the feature point tracking condition.

The feature point tracking condition is a condition under which a feature point of a currently marked image is tracked. When an image captured by a smart device meets the feature point tracking condition, the smart device may continue tracking the image. When the image captured by the smart device fails to meet the feature point tracking condition, the marked image needs to be switched to prevent a tracking failure.

Therefore, during acquisition of position and attitude parameters of the image by tracking a feature point of the first marked image, the smart device further determines whether the image meets the feature point tracking condition while capturing the image. For example, for the first image captured by the camera and the previous image of the first image, the camera first captures the previous image of the first image, and the previous image of the first image meets the feature point tracking condition, and then position and attitude parameters of the previous image of the first image are acquired in the foregoing step 302. Afterwards, the camera captures the first image, but the first image fails to meet the feature point tracking condition, and then the previous image of the first image is used as a second marked image. The position and attitude parameters of the previous image of the first image are position and attitude parameters of the second marked image.

In some embodiments, the feature point tracking condition may be that a number of tracked feature points reaches a preset number. When a number of tracked feature points of a first marked image in an image reaches the preset number, the image is determined to meet the feature point tracking condition. When the number of tracked feature points of the first marked image in the image fails to reach the preset number, the image is determined not to meet the feature point tracking condition.

Correspondingly, for the previous image of the first image, a number of tracked feature points in the previous image of the first image is acquired. When the number reaches the preset number, it is determined that the previous image of the first image meets the feature point tracking condition. For the first image, a number of tracked feature points in the first image is acquired. When the number fails to reach a preset number, the first image is determined not to meet the feature point tracking condition.

304. Acquire, by tracking a feature point of the second marked image, position and attitude parameters of an image captured by the camera relative to the second marked image.

After the first marked image is switched to the second marked image, a plurality of feature points are extracted from the second marked image as updated target feature points. The smart device captures at least one image through the camera with a change in a position or attitude of the camera, and obtains, by tracking the feature point of the second marked image at the at least one image, position and attitude parameters of each image relative to a previous image.

For two adjacent images captured by the camera, a feature point of the first marked image extracted from the previous image is used to perform optical flow, so as to find a matching feature point between the previous image and the next image, and obtain optical flow information of the matching feature point. The optical flow information is used for representing movement information of the matching feature point in the two adjacent images. Therefore, position and attitude parameters of a second image relative to a first image in two adjacent images may be determined according to the optical flow information of the matching feature point. An algorithm used for the optical flow may be a Lucas-Kanade optical flow algorithm or other algorithms. In addition to the optical flow, a descriptor or a direct method may be further used for matching the feature point to find the matching feature point between the previous image and the next image.

Then, for example, for a second image captured by the camera after the second marked image, position and attitude parameters of each of the second marked image to the image relative to a previous image are acquired. Iteration may be performed according to the position and attitude parameters of each image relative to the previous image, so that position and attitude parameters of the second image relative to the second marked image are determined. The position and attitude parameters may include at least one of a translation parameter and a rotation parameter. The translation parameter is used for representing a distance between a position at which the camera captures the second image and a position at which the camera captures second marked image. The rotation parameter is used for representing an angle difference between a rotation angle at which the camera captures the second image and a rotation angle at which the camera captures the second marked image.

305. Acquire position and attitude parameters of the image according to the position and attitude parameters of the image relative to the second marked image and position and attitude parameters of each marked image relative to a previous marked image, and determine a position and an attitude of the camera according to the position and attitude parameters.

For example, in the embodiment of this application, for the second image, when the first marked image is the initial marked image, position and attitude parameters of the second image relative to the initial marked image, that is, the position and attitude parameters of the second image, are acquired according to the position and attitude parameters of the second image relative to the second marked image and the position and attitude parameters of the second marked image relative to the first marked image (that is, the position and attitude parameters of the second marked image relative to the initial marked image), and the position and attitude of the camera may be determined according to the position and attitude parameters.

In another embodiment, when the first marked image is not the initial marked image, position and attitude parameters of the second image relative to the initial marked image are acquired as position and attitude parameters of the second image according to the position and attitude parameters of the second image relative to the second marked image, the position and attitude parameters of the second marked image relative to the first marked image, and the position and attitude parameters of the first marked image relative to the initial marked image.

The second image is any image captured after the second marked image, and may be the first image or any image captured after the first image.

For the first image, when the position and attitude parameters of the first image are acquired, the position and attitude parameters of the second marked image relative to the initial marked image are acquired according to the position and attitude parameters of the second marked image relative to the first marked image and the position and attitude parameters of the first marked image relative to the initial marked image. In addition, the position and attitude parameters of the first image are acquired according to the position and attitude parameters of the first image relative to the second marked image and the position and attitude parameters of the second marked image relative to the initial marked image by using the following formula:

$$\begin{bmatrix} R\_final & T\_final \\ 0 & 1 \end{bmatrix} = \begin{bmatrix} Rcl & Tcl \\ 0 & 1 \end{bmatrix} * \begin{bmatrix} R\_old & T\_old \\ 0 & 1 \end{bmatrix};$$

R_final representing a rotation parameter of the first image, and T_final representing a translation parameter of the first image; Rcl representing a rotation parameter of the first image relative to the second marked image, and Tcl representing a translation parameter of the first image relative to the second marked image; and R_old representing a rotation parameter of the second marked image relative to the initial marked image, and T_old representing a translation parameter of the second marked image relative to the initial marked image.

First, during the tracking, three-dimensional coordinates of the feature point need to be determined, and then changes in the position and attitude of the camera in a three-dimensional space may be determined by tracking the feature point. Accordingly, during extraction of the feature point in the second marked image, after two-dimensional coordinates of the feature point in the second marked image are determined, homogeneous coordinates corresponding to the two-dimensional coordinates of the feature point are acquired. The homogeneous coordinates are used for representing the two-dimensional coordinates in a three-dimensional form. The homogeneous coordinates are transformed into corresponding three-dimensional coordinates by using the following coordinate transformation relationship:

$$M = s * \begin{bmatrix} \frac{1}{fx} & 0 & -\frac{cx}{fx} \\ 0 & \frac{1}{fy} & -\frac{cy}{fy} \\ 0 & 0 & 1 \end{bmatrix} * m;$$

M representing the three-dimensional coordinates, m representing the homogeneous coordinates, S representing a depth of a marked image at which the feature point is located, and fx, fy, cx, and cy representing parameters of the camera.

For example, the homogeneous coordinates of the feature point may be [μ, v, 1], and then the three-dimensional coordinates of the feature point may be $$M = s * \begin{bmatrix} \frac{1}{fx} & 0 & -\frac{cx}{fx} \\ 0 & \frac{1}{fy} & -\frac{cy}{fy} \\ 0 & 0 & 1 \end{bmatrix} * \begin{bmatrix} \mu \\ v \\ 1 \end{bmatrix}.$$

Second, during tracking of the feature point, with the changes in the position and the attitude of the camera, a number of feature points in two adjacent captured images may be reduced, resulting in that some feature points in the previous image do not have matching feature points in the next image. When feature points included in two adjacent images are matched, some mismatched feature points are excluded.

In addition, the smart device may further check an optical flow matching result to exclude an unreasonable feature point. For example, for a second image captured by the camera after the second marked image, according to three-dimensional coordinates of a plurality of feature points in the second marked image and position and attitude parameters of the second image relative to the second marked image, changes in a position and an attitude of a feature point are simulated, estimated three-dimensional coordinates of each feature point in the second image are calculated, the estimated three-dimensional coordinates of each feature point in the second image are transformed to obtain estimated two-dimensional coordinates of each feature point in the second image. The estimated two-dimensional coordinates of each feature point in the second image are compared with actual two-dimensional coordinates to acquire a distance between the estimated two-dimensional coordinates of each feature point in the second image and the actual two-dimensional coordinates of each feature point in the second image. When the distance between the estimated two-dimensional coordinates of any feature point in the second image and the actual two-dimensional coordinates in the second image is greater than a preset distance, it indicates that a position of the feature point obtained through simulating changes in a position and an attitude of the camera starting from the second marked image according to the calculated position and attitude parameters is significantly different from an actual position. It may be deemed that changes in the position and attitude of the feature point does not conform to a due rotation and translation relationship, and a great error is caused. Therefore, the feature point is deleted in order to prevent the feature point from affecting subsequent tracking.

The estimated three-dimensional coordinates are transformed to obtain the estimated two-dimensional coordinates according to an inverse transformation of the coordinate transformation relationship. In other words, the estimated three-dimensional coordinates are transformed into the estimated two-dimensional coordinates in the following inverse transformation relationship:

$$m = \begin{bmatrix} \frac{1}{fx} & 0 & -\frac{cx}{fx} \\ 0 & \frac{1}{fy} & -\frac{cy}{fy} \\ 0 & 0 & 1 \end{bmatrix}^{-1} * S^{-1} * M;$$

M representing the estimated three-dimensional coordinates, m representing the estimated two-dimensional coordinates, S representing a depth of a marked image at which the feature point is located, and fx, fy, cx, and cy representing parameters of the camera.

After a mismatched feature point or a feature point with a great error is excluded, the smart device acquires a number of feature points in the second image, and then determines whether the second image meets the feature point tracking condition of the second marked image, thereby determining whether the marked image is to be switched.

Third, in order to ensure depth continuity, during tracking of the first marked image, it is assumed that depths of all feature points on the first marked image are s, and during tracking of the second marked image, not only the depths of all feature points on the second marked image need to be equal, but also the depths of the feature points on the first marked image need to be still s. Therefore, a depth of each marked image during the tracking may be calculated iteratively.

$S_n$ representing the depth of the second marked image, d representing the depth of the feature point of the first marked image in the second marked image, $S_{n-1}$ representing the depth of the first marked image, and d may be obtained through calculation of the position and attitude parameters of the second marked image. A depth of the second marked image may be calculated by using the following formula: $S_n = d * S_{n-1}$. It may be assumed that depths of feature points in the first image captured by the camera are all 1. After the depth of the marked image is updated to $S_n$, the second marked image, the three-dimensional coordinates of the feature point extracted from the second marked image, and the depth $S_n$ of the second marked image are calculated by using a PnP algorithm to track a translation parameter of the camera.

In the method according to the embodiment of this application, during tracking of the feature point of the first marked image and acquisition of the position and attitude parameters of the image captured by the camera, when the previous image of the first image meets the feature point tracking condition but the first image fails to meet the feature point tracking condition, the previous image of the first image is used as the second marked image. Afterwards, the feature point of the second marked image is tracked, the position and attitude parameters of the image are acquired according to the position and attitude parameters of the image captured by the camera relative to the second marked image and the position and attitude parameters of each marked image relative to the previous marked image, and the position and attitude of the camera are determined according to the position and attitude parameters. A marked image is switched when the first image fails to meet the feature point tracking condition, and the position and attitude of the camera are determined by tracking a feature point of a new marked image after switch, preventing a failure of tracking the feature point due to excessive changes in the position or attitude of the camera, increasing robustness and improving tracking accuracy of the camera. The method according to the embodiment of this application is lightweight and simple without complex back-end optimization, achieving a very fast calculation speed and even achieving real-time tracking. Compared with a traditional simultaneous localization and mapping (slam) algorithm, the method according to the embodiment of this application is more robust and may achieve very high calculation accuracy.

In addition, no marked image is needed to be preset, and a current scene is only needed to be captured to obtain one image that is determined as the initial marked image, so that the marked image may be initialized, getting rid of a limitation of presetting of the marked image and expanding an application scope.

Figure 4:
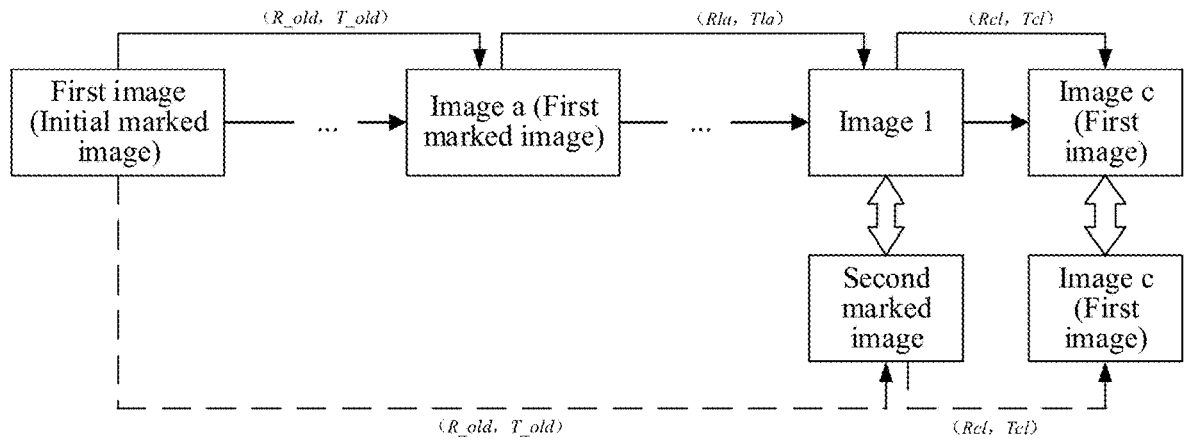
FIG. 4 is a schematic diagram of an image according to an embodiment of this application.

For example, the plurality of images captured by the camera are shown in FIG. 4. A tracking process includes steps below.

1. A camera captures a first image used as an initial marked image.

2. Acquire, by tracking a feature point of the initial marked image, position and attitude parameters of an image captured by the camera relative to the initial marked image until a next image of an image a fails to meet a feature point tracking condition, use the image a as a first marked image, position and attitude parameters (R_old, T_old) of a currently marked image relative to the initial marked image being position and attitude parameters of the image a relative to the first image.

3. Acquire, by tracking a feature point of the first marked image, position and attitude parameters of the image captured by the camera relative to the first marked image until acquiring position and attitude parameters of an image 1 relative to the first marked image. Afterwards, because an image c fails to meet the feature point tracking condition, position and attitude parameters of the image c relative to the first marked image cannot be acquired.

4. Use the image 1 as the second marked image, and update position and attitude parameters (R_old, T_old) of a currently marked image relative to the initial marked image to position and attitude parameters of the image 1 relative to the first image.

5. Acquire, by tracking a feature point of the second marked image, position and attitude parameters (Rcl, Tcl) of the image captured by the camera relative to the second marked image, acquire, according to position and attitude parameters (R_old, T_old) of the second marked image relative to the initial marked image and position and attitude parameters (Rcl, Tcl) of the image captured by the camera relative to the second marked image, position and attitude parameters (R_final, T_final) of the image captured by the camera relative to the initial marked image, and determine a position and an attitude of the camera according to the position and attitude parameters (R_final, T_final).

In an embodiment of this application, the position and attitude parameters may include a translation parameter and a rotation parameter. The translation parameter is used for representing a translation of the camera to determine a change in a position of the camera in a three-dimensional space. The rotation parameter is used for representing a change in a rotation angle of the camera to determine a change in the attitude of the camera in the three-dimensional space. The translation parameter and rotation parameter of the camera may be acquired by performing the foregoing steps. Alternatively, the translation parameter other than the rotation parameter of the camera may be acquired by performing the foregoing steps. Acquisition of the rotation parameter of the camera is shown in detail in an embodiment below.

Figure 5:
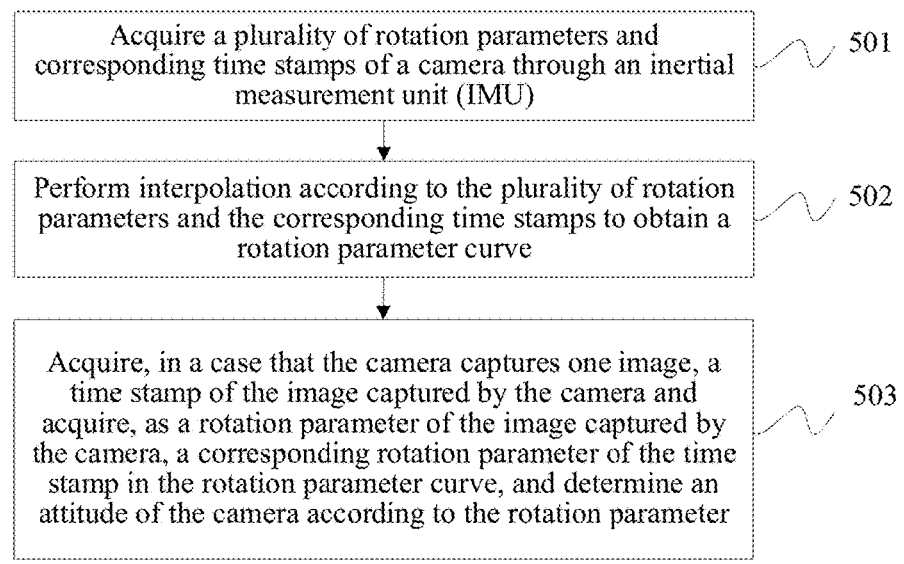
FIG. 5 is a flow chart of a position and attitude determining method according to an embodiment of this application.

FIG. 5 is a flow chart of a position and attitude determining method according to an embodiment of this application. The position and attitude determining method is performed by a smart device. The smart device may be a terminal such as a mobile phone or a tablet computer equipped with a camera, or an AR device such as AR glasses or an AR helmet equipped with a camera. Referring to FIG. 5, the method includes the following.

501. Acquire a plurality of rotation parameters and corresponding time stamps of the camera through an inertial measurement unit (IMU).

A time stamp corresponding to each rotation parameter refers to a time stamp for acquiring the rotation parameter.

502. Perform interpolation according to the plurality of rotation parameters and the corresponding time stamps to obtain a rotation parameter curve.

An interpolation algorithm may be a spherical linear interpolation (Slerp) algorithm or other algorithms.

Interpolation is performed according to the plurality of rotation parameters and the corresponding time stamps to obtain the rotation parameter curve. The rotation parameter curve may represent a change rule of a rotation parameter of the camera with photographing time.

503. Acquire, when the camera captures one image, a time stamp of the image captured by the camera and acquire, as a rotation parameter of the image captured by the camera, a corresponding rotation parameter of the time stamp in the rotation parameter curve, and determine a attitude of the camera according to the rotation parameter.

Because a photographing frequency of an image does not match a sampling frequency of the IMU, the rotation parameter curve is obtained by interpolation, and data alignment may be performed according to the rotation parameter curve, thereby obtaining the rotation parameter corresponding to the image, and determining the attitude of the camera according to the rotation parameter.

In one embodiment, a gyroscope, an accelerometer, and a geomagnetic sensor are configured for the smart device. A sole rotation parameter in an earth coordinate system may be obtained through the gyroscope and the geomagnetic sensor. The earth coordinate system has characteristics below:

1. An X axis is defined by a vector product, tangent to the ground at a current position of the smart device, and points east;

2. A Y axis is tangent to the ground at the current position of the smart device and points to the North Pole of the geomagnetic field; and 3. A Z axis points to the sky and is perpendicular to the ground.

The rotation parameter obtained through the earth coordinate system may be considered to be error-free without depending on a parameter of the IMU, preventing a calibration problem of the IMU and being compatible with various types of devices.

The smart device provides an interface to acquire the rotation parameter: a rotation-vector interface. The rotation-vector interface may be invoked according to a sampling frequency of the IMU to acquire the rotation parameter.

The smart device may store the obtained plurality of rotation parameters and the corresponding time stamps to an IMU queue, and obtain the rotation parameter curve by reading data in the IMU queue and performing interpolation. Alternatively, considering that there may be noise in the data, in order to ensure accuracy of the data, an angle difference between an obtained rotation parameter and a previous rotation parameter may be calculated. If the angle difference is greater than a preset threshold, the obtained rotation may be considered to be a noise item, and the rotation parameter is deleted. The noise item may be deleted through the foregoing detection. A rotation parameter passing the detection and a corresponding time stamp thereof are only stored to the IMU queue.

In the method according to the embodiment of this application, interpolation is performed according to the plurality of rotation parameters measured based on IMU and the corresponding time stamps to obtain the rotation parameter curve, the data alignment may be performed according to the rotation parameter curve, and the rotation parameter of the image is acquired according to the time stamp and the rotation parameter curve of the captured image without depending on the parameter of the IMU, improving accuracy and preventing IMU calibration. In addition, due to a low calculating capability of the smart device, a calculation amount may be reduced by acquiring the rotation parameter through the IMU, thereby improving a calculation speed. What is more, the noise item is deleted to improve data accuracy, further improving precision.

Figure 6:
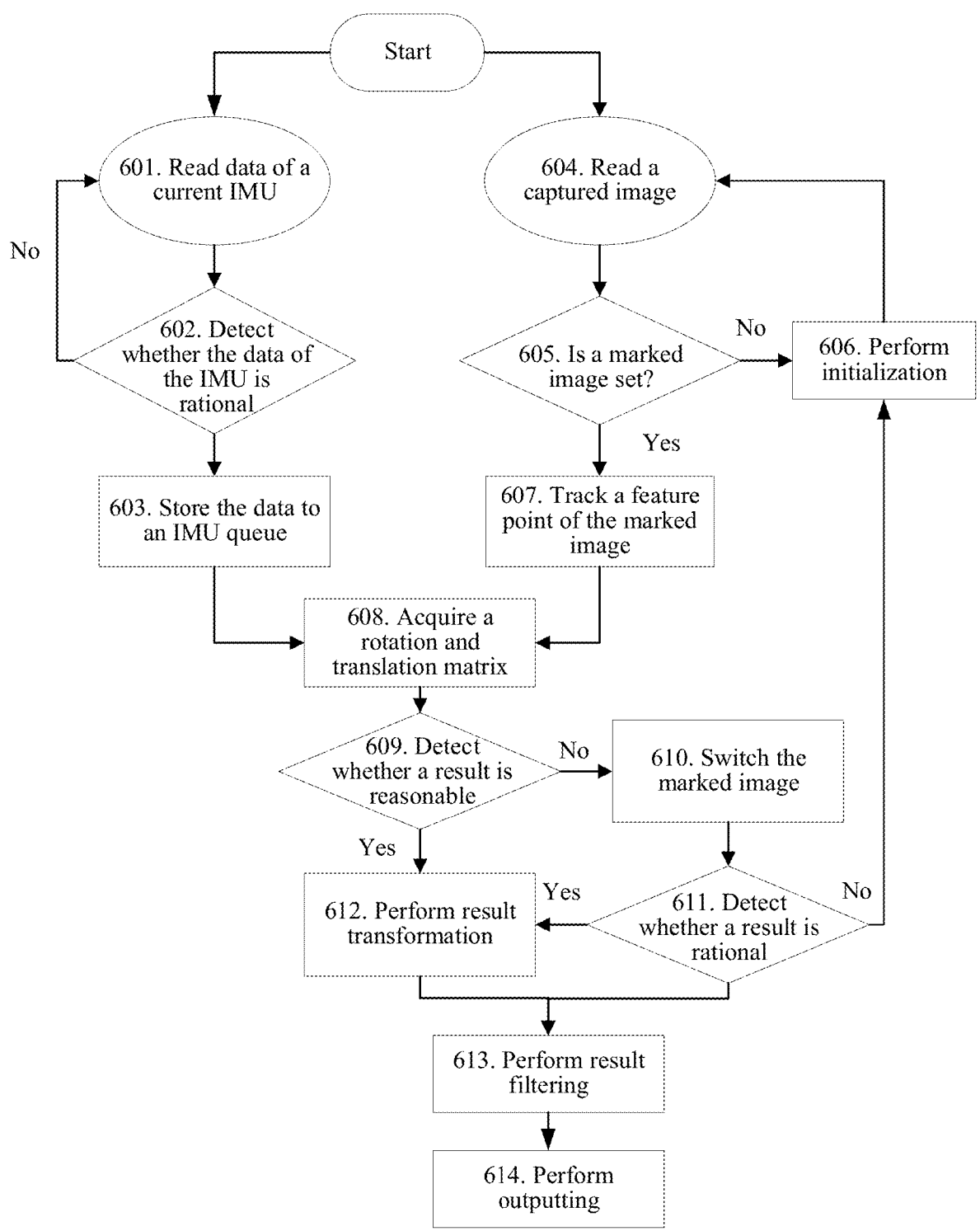
FIG. 6 is a schematic diagram of an operation process according to an embodiment of this application.

An operation process according to an embodiment of this application may be shown in FIG. 6. Referring to FIG. 6, functions of a smart device are divided into a plurality of modules. The operation process is shown below.

1. Read data measured by an IMU through a module 601, the data including a rotation parameter and a corresponding time stamp; detecting whether the data is reasonable through a module 602; if not, discard the data, and if yes, store the data in an IMU queue through a module 603.

2. Read a captured image through a module 604 and determine whether a marked image is set currently. Initialize, when no marked image is set, one marked image by using the currently captured image; and directly establish a connection with the marked image through a module 607, and track a feature point of the marked image when the marked image is set.

3. Acquire, through a module 608 in combination with data in the IMU queue and data obtained by tracking a feature point, a translation parameter and a rotation parameter, and calculate a rotation and translation matrix from a current image relative to a currently marked image.

4. Detect, through a module 609, whether the rotation parameter and the translation parameter of the image are reasonable, if yes, transmit a detection result into a module 612, and transform, through the module 612, the rotation and translation matrix of the current image relative to the currently marked image into a rotation and translation matrix of the current image relative to an initial marked image; if not, switch the marked image through a module 610, calculate a rotation and translation matrix of a current image relative to a currently marked image, and detect whether the result is reasonable through the module 611, if yes, transmit a detection result into the module 612, if not, return to the module 606, and re-perform initialization by using the current image.

5. Smooth and output data results obtained through the module 613 and the module 614. A kalman filter or other filters may be used during smoothing.

Based on the foregoing, the embodiment of this application provides a set of camera attitude tracking algorithms: anchor-switching algorithms. A movement process of the camera is divided into a plurality of tracking processes of marked images. Each process is an independent marked image tracking process. When tracking fails, connection is performed by switching the marked image on a previous frame of image. In view of a low computing capability of the smart device, a rotation parameter of the camera relative to an initial scene is obtained by using the IMU. An image of a real scene is used as the marked image. A translation parameter of the camera relative to a currently marked image is obtained by tracking, and a translation parameter of the camera relative to the initial scene is obtained by switching the marked image, to obtain changes in a position and an attitude of the camera relative to the initial scene, so that a set of stable, rapid, and robust camera attitude tracking system in a real and natural scene without depending on a pre-specified marked image, increasing a computing speed, improving system robustness, and achieving very high camera positioning precision. In addition, a complex IMU and image fusion algorithm are prevented, and parameter sensitivity is also reduced. The method according to the embodiment of this application may be smoothly performed at a mobile terminal without accurate calibration.

The embodiment of this application corresponds to a scene in which the human eye observes a three-dimensional space. A rotation parameter has a great influence, and it is assumed that a movement on the plane is not great. In an AR scene, because a user usually interacts with a virtual element in a plane scene, such as a coffee table, etc., it may be considered that the camera is moved on the plane, and the rotation parameter has a great impact. Therefore, the embodiment of this application is extremely applicable to an AR scene.

Figure 7:
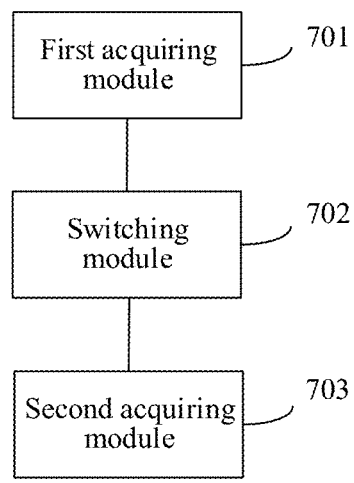
FIG. 7 is a schematic structural diagram of a position and attitude determining apparatus according to an embodiment of this application.

FIG. 7 is a schematic structural diagram of a position and attitude determining apparatus according to an embodiment of this application. Referring to FIG. 7, the apparatus is applied to a smart device and includes: a first acquiring module 701 configured to perform the step in the foregoing embodiment of acquiring, by tracking a feature point of a first marked image, position and attitude parameters of an image captured by a camera; a switching module 702 configured to perform the step in the foregoing embodiment of using a previous image of a first image as a second marked image; and a second acquiring module 703 configured to perform the step in the foregoing embodiment of acquiring, by tracking a feature point of the second marked image, position and attitude parameters of the image captured by the camera relative to the second marked image to acquire position and attitude parameters of the image, and determining a position and an attitude according to the position and attitude parameters.

In some embodiments, the second acquiring module 703 includes: an extracting unit configured to perform the step in the foregoing embodiment of extracting a plurality of feature points from the second marked image; a tracking unit configured to perform the step in the foregoing embodiment of obtaining position and attitude parameters of each image relative to a previous image by tracking the plurality of feature points; and a determining unit configured to perform the step in the foregoing embodiment of determining position and attitude parameters of a second image relative to the second marked image.

In some embodiments, the apparatus further includes: a three-dimensional coordinate calculating module configured to perform the step in the foregoing embodiment of calculating estimated three-dimensional coordinates of each feature point in the second image; a coordinate transforming module configured to perform the step in the foregoing embodiment of transforming the estimated three-dimensional coordinates to obtain estimated two-dimensional coordinates; and a deleting module configured to perform the step in the foregoing embodiment of deleting the feature point.

In some embodiments, the first acquiring module 701 is further configured to perform the step in the foregoing embodiment of acquiring, according to the position and attitude parameters of the first marked image relative to the initial marked image and the position and attitude parameters of the image relative to the first marked image, the position and attitude parameters of the image by using a formula.

In some embodiments, the second acquiring module 703 is further configured to perform the step in the foregoing embodiment of acquiring, according to the position and attitude parameters of the second marked image relative to the first marked image, the position and attitude parameters of the first marked image relative to the initial marked image, and the position and attitude parameters of the first image relative to the second marked image, the position and attitude parameters of the first image by using a formula.

In some embodiments, the apparatus further includes: a number acquiring module configured to perform the step in the foregoing embodiment of acquiring a number of the feature points; and a determining module configured to perform the step in the foregoing embodiment of determining, when the number reaches a preset number, that the first image fails to meet the feature point tracking condition.

In some embodiments, the apparatus further includes: a homogeneous coordinate acquiring module configured to perform the foregoing step in the foregoing embodiment of acquiring homogeneous coordinates corresponding to two-dimensional coordinates of the feature points; and a coordinate transformation module configured to perform the step in the foregoing embodiment of transforming the homogeneous coordinates into corresponding three-dimensional coordinates by using a coordinate transformation relationship.

In some embodiments, the apparatus further includes: a depth calculating module configured to perform the step in the foregoing embodiment of calculating a depth of the second marked image by using a formula.

In some embodiments, the apparatus further includes: an initializing module configured to perform the step in the foregoing embodiment of determining a captured image as a first marked image.

In some embodiments, the position and attitude parameters include a translation parameter, and the apparatus further includes: an interpolating module configured to perform the step in the foregoing embodiment of performing interpolation by using data acquired through an IMU to obtain a rotation parameter curve; and a rotation parameter acquiring module configured to perform the step in the foregoing embodiment of acquiring a rotation parameter of an image according to the rotation parameter curve.

For the position and attitude determining apparatus in the foregoing embodiments, division of the functional modules is only illustrated during determination of the position and attitude parameters. In one embodiment, the functions are completed by different functional modules as required. In other words, an internal structure of the smart device is divided into different functional modules to complete all or a part of the described functions. In addition, the position and attitude determining apparatus and position and attitude determining method embodiments in the foregoing embodiments are designed with a same idea, and a specific implementation thereof is shown in the method embodiments, and the details thereof are not described herein again.

Figure 8:
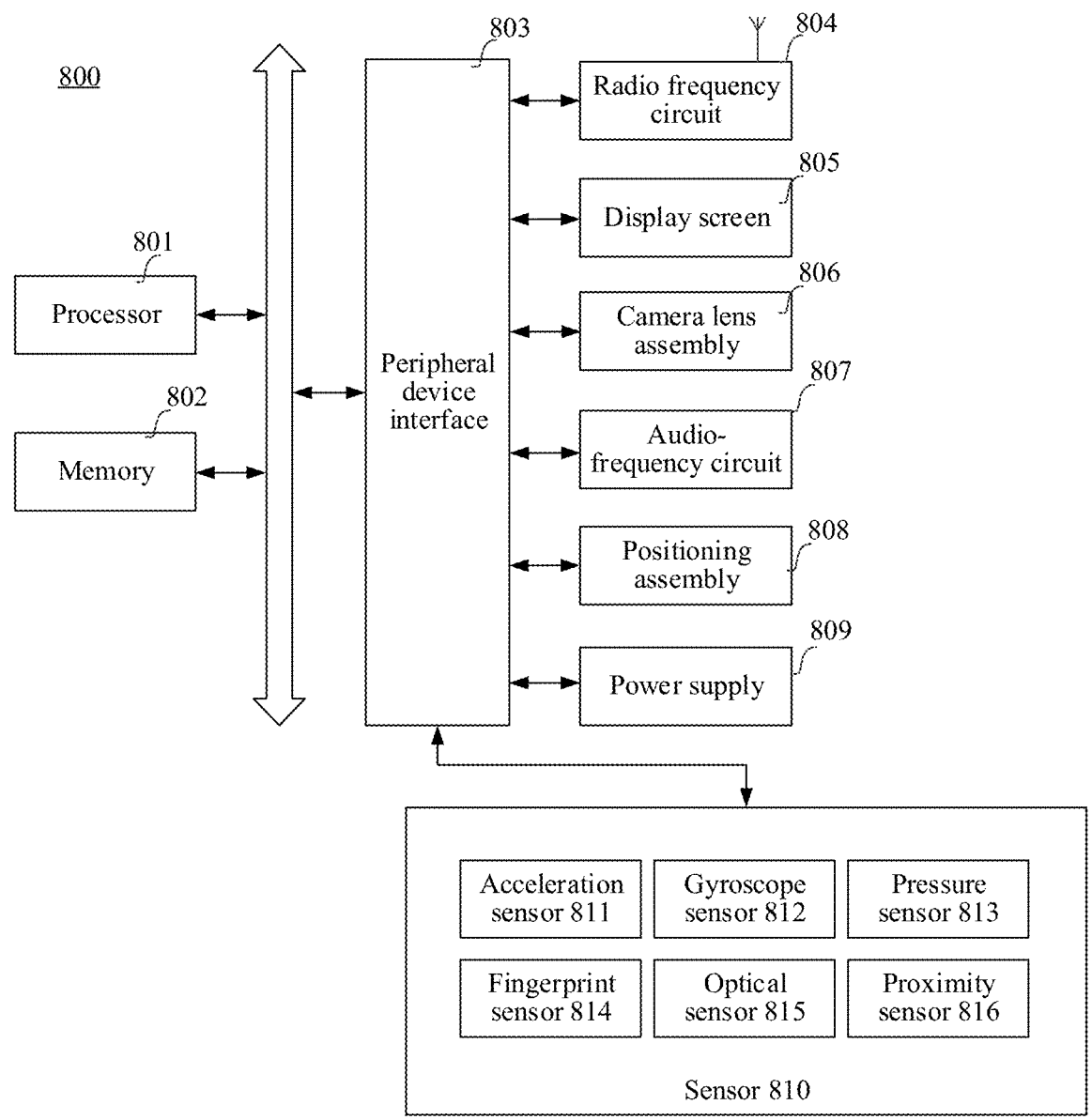
FIG. 8 is a schematic structural diagram of a terminal according to an embodiment of this application.

FIG. 8 shows a structural block diagram of a terminal 800 according to an exemplary embodiment of this application. The terminal 800 is used to perform the steps performed by the smart device in the foregoing method embodiments.

The terminal 800 may be a portable mobile terminal such as a smartphone, a tablet computer, a moving picture experts group audio layer III (MP3) player, a moving picture experts group audio layer IV (MP4) player, a notebook computer, or a desktop computer, or may be an AR device such as AR glasses or an AR helmet. The terminal 800 may also be referred to as another name such as user equipment, portable terminal, laptop terminal, and desktop terminal.

The terminal 800 includes a processor 801 and a memory 802. The memory 802 stores at least one instruction, at least one program, and a code set, or an instruction set. The instruction, the program, and the code set, or the instruction set are loaded and executed by the processor 801 to implement the operations performed by the smart device in the foregoing embodiments.

The processor 801 may include one or more processing cores, for example, a 4-core processor or a 5-core processor. The processor 801 may be implemented by at least one hardware form of a digital signal processor (DSP), a field-programmable gate array (FPGA), and a programmable logic array (PLA). The processor 801 may alternatively include a main processor and a coprocessor. The main processor is configured to process data in an awake state, also referred to as a central processing unit (CPU), and the coprocessor is a low-power processor configured to process data in an idle state. In some embodiments, the processor 801 may be integrated with a graphics processing unit (GPU). The GPU is responsible for rendering and drawing content to be displayed by a display screen. In some embodiments, the processor 801 may further include an artificial intelligence (AI) processor. The AI processor is configured to process a calculation operation related to machine learning.

The memory 802 may include one or more computer-readable storage media. The computer-readable storage media may be non-transient. The memory 802 may further include a high-speed random access memory, and a non-volatile memory such as one or more magnetic disk storage devices and a flash memory device. In some embodiments, the non-transient computer-readable storage medium in the memory 802 is configured to store at least one instruction. The at least one instruction is executed by the processor 801 to perform the position and attitude determining method provided in the method embodiment of this application.

In some embodiments, the terminal 800 may further In some embodiments include a peripheral device interface 803 and at least one peripheral device. The processor 801, the memory 802, and the peripheral device interface 803 may be connected through a bus or a signal cable. Each peripheral device may be connected to the peripheral device interface 803 through a bus, a signal cable, or a circuit board. Specifically, the peripheral device includes at least one of a radio frequency (RF) circuit 804, a touch display screen 805, a camera component 806, an audio frequency circuit 807, a positioning component 808, and a power supply 809.

The peripheral device interface 803 may be configured to connect at least one peripheral device related to input/output (I/O) to the processor 801 and the memory 802. In some embodiments, the processor 801, the memory 802, and the peripheral device interface 803 are integrated into the same chip or circuit board. In some other embodiments, any one or two of the processor 801, the memory 802, and the peripheral device interface 803 may be implemented on an independent chip or circuit board, and the implementation is not limited in this embodiment.

The radio frequency circuit 804 is configured to receive and transmit a radio frequency (RF) signal, also referred to as an electromagnetic signal. The radio frequency circuit 804 communicates with a communications network and another communications device by using the electromagnetic signal. The radio frequency circuit 804 may convert an electric signal into an electromagnetic signal for transmission, or convert a received electromagnetic signal into an electric signal. In some embodiments, the radio frequency circuit 804 includes an antenna system, an RF transceiver, one or more amplifiers, a tuner, an oscillator, a digital signal processor, a codec chip set, a subscriber identity module card, and the like. The radio frequency circuit 804 may communicate with another terminal by using a wireless communication protocol. The wireless communication protocol includes, but is not limited to a metropolitan area network, generations of mobile communication networks (2G, 3G, 4G, and 5G), a wireless local area network and/or a wireless fidelity (Wi-Fi) network. In some embodiments, the radio frequency circuit 804 may further include a near field communication (NFC) related circuit, and is not limited in this application.

The display screen 805 is configured to display a user interface (UI). The UI may include a graph, text, an icon, a video, and any combination thereof. When the display screen 805 is a touch display screen, the display screen 805 is further capable of collecting a touch signal on or over a surface of the display screen 805. The touch signal may be inputted into the processor 801 as a control signal for processing. In this case, the display screen 805 may be further configured to provide a virtual button and/or a virtual keyboard, also referred to as a soft button and/or a soft keyboard. In some embodiments, there is one display screen 805, disposed on a front panel of the terminal 800. In some other embodiments, there may be two display screens 805, respectively disposed on different surfaces of the terminal 800 or designed in a foldable shape. In still some other embodiments, the display screen 805 may be a flexible display screen, disposed on a curved surface or a folded surface of the terminal 800. Even, the display screen 805 may be further set to have a non-rectangular irregular graph, that is, a special-shaped screen. The display screen 805 may be manufactured by using a material such as a liquid crystal display (LCD), an organic light-emitting diode (OLED), or the like.

The camera component 806 is configured to collect an image or a video. In some embodiments, the camera component 806 includes a front-facing camera and a rear-facing camera. Generally, the front-facing camera is disposed on the front panel of the terminal, and the rear-facing camera is disposed on a back face of the terminal. In some embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and virtual reality (VR) shooting functions through fusion of the main camera and wide-angle camera, or another fusion shooting function. In some embodiments, the camera component 806 may further include a flash. The flash may be a single color temperature flash or a double color temperature flash. The double color temperature flash refers to a combination of a warm flash and a cold flash, and may be configured to perform light ray compensation at different color temperatures.

The audio circuit 807 may include a microphone and a loudspeaker. The loudspeaker is configured to collect sound waves of a user and an environment, and convert the sound waves into electric signals and input the electrical signals into the processor 801 for processing, or input the electrical signals into the radio frequency circuit 804 to implement speech communication. For the purpose of stereo sound collection or noise reduction, there may be a plurality of microphones, respectively disposed at different parts of the terminal 800. The microphone may be further a microphone array or an omnidirectional collection microphone. The loudspeaker is configured to convert electric signals from the processor 801 or the radio frequency circuit 804 into sound waves. The loudspeaker may be a conventional thin-film loudspeaker or a piezoelectric ceramic loudspeaker. When the loudspeaker is the piezoelectric ceramic loudspeaker, electric signals not only can be converted into sound waves that can be heard by human, but also can be converted into sound waves that cannot be heard by human for ranging and the like. In some embodiments, the audio circuit 807 may further include an earphone jack.

The positioning component 808 is configured to position a current geographic location of the terminal 800, to implement a navigation or a location based service (LBS). The positioning assembly 808 may be a positioning assembly based on the United States' Global Positioning System (GPS), China's BeiDou Navigation Satellite System (BDS), Russia's Global Navigation Satellite System (GLONASS) or the European Union's Galileo System.

The power supply 809 is configured to supply power to components in the terminal 800. The power supply 809 may be an alternating current, a direct current, a primary battery, or a rechargeable battery. When the power supply 809 includes the rechargeable battery, the rechargeable battery may support wired charging or wireless charging. The rechargeable battery may be further configured to support a quick charge technology.

In some embodiments, the terminal 800 further includes one or more sensors 810. The one or more sensors 810 include, but are not limited to, an acceleration sensor 811, a gyroscope sensor 812, a pressure sensor 813, a fingerprint sensor 814, an optical sensor 815, and a proximity sensor 816.

The acceleration sensor 811 may detect acceleration on three coordinate axes of a coordinate system established by the terminal 800. For example, the acceleration sensor 811 may be configured to detect components of gravity acceleration on the three coordinate axes. The processor 801 may control, according to a gravity acceleration signal collected by the acceleration sensor 811, the display screen 805 to display the user interface in a frame view or a portrait view. The acceleration sensor 811 may be further configured to collect motion data of a game or a user.

The gyroscope sensor 812 may detect a body direction and a rotation angle of the terminal 800. The gyroscope sensor 812 may cooperate with the acceleration sensor 811 to collect a 3D action by the user on the terminal 800. The processor 801 may implement the following functions according to data collected by the gyroscope sensor 812: motion sensing (for example, the UI is changed according to a tilt operation of the user), image stabilization during shooting, game control, and inertial navigation.

The pressure sensor 813 may be disposed on a side frame of the terminal 800 and/or a lower layer of the display screen 805. When the pressure sensor 813 is disposed on the side frame of the terminal 800, a holding signal of the user on the terminal 800 may be detected. The processor 801 performs left and right hand recognition or a quick operation according to the holding signal collected by the pressure sensor 813. When the pressure sensor 813 is disposed on the low layer of the display screen 805, the processor 801 controls, according to a pressure operation of the user on the display screen 805, an operable control on the UI. The operable control includes at least one of a button control, a scroll bar control, an icon control, and a menu control.

The fingerprint sensor 814 is configured to collect a fingerprint of the user. The processor 801 identifies an identity of the user according to the fingerprint collected by the fingerprint sensor 814, or the fingerprint sensor 814 identifies an identity of the user according to the collected fingerprint. When the identity of the user is identified as a trusted identity, the processor 801 authorizes the user to perform a related sensitive operation. The sensitive operation includes unlocking a screen, viewing encrypted information, downloading software, payment, changing settings, and the like. The fingerprint sensor 814 may be disposed on a front face, a back face, or a side face of the terminal 800. When a physical button or a vendor logo is disposed on the terminal 800, the fingerprint 814 may be integrated with the physical button or the vendor logo.

The optical sensor 815 is configured to collect ambient light intensity. In an embodiment, the processor 801 may control display luminance of the display screen 805 according to the ambient light intensity collected by the optical sensor 815. Specifically, when the ambient light intensity is relatively high, the display luminance of the display screen 805 is increased. When the ambient light intensity is relatively low, the display luminance of the display screen 805 is reduced. In another embodiment, the processor 801 may further dynamically adjust shooting parameters of the camera component 806 according to the ambient light intensity collected by the optical sensor 815.

The proximity sensor 816, also referred to as a distance sensor, is usually disposed on the front panel of the terminal 800. The proximity sensor 816 is configured to collect a distance between a front face of the user and the front face of the terminal 800. In an embodiment, when the proximity sensor 816 detects that the distance between the front face of the user and the front face of the terminal 800 is gradually decreased, the processor 801 controls the display screen 805 to switch from a screen-on state to a screen-off state. When the proximity sensor 816 detects that the distance between the front face of the user and the front face of the terminal 800 is gradually increased, the processor 801 controls the display screen 805 to switch from the screen-off state to the screen-on state.

A person skilled in the art may understand that the structure shown in FIG. 8 does not constitute a limitation to the terminal 800, and the terminal may include more components or fewer components than those shown in the figure, or some components may be combined, or a different component deployment may be used.

An embodiment of this application further provides a position and pose determining apparatus. The position and attitude determining apparatus includes a processor and a memory. The memory stores at least one instruction, at least one program, a code set, or an instruction set. The instruction, program, code set, or instruction set is loaded by the processor and has operations to implement the position and pose determining method in the foregoing embodiment.

An embodiment of this application further provides a computer readable storage medium. The computer readable storage medium stores at least one instruction, at least one program, a code set, or an instruction set. The instruction, the program, the code set, or the instruction set is loaded by the processor and has operations to implement the position and pose determining method in the foregoing embodiment.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A position and attitude determining method, comprising:
acquiring, by tracking a feature point of a first marked image, position and attitude parameters of an image captured by a camera;
using a previous image of a first image as a second marked image in response to the previous image of the first image meeting a feature point tracking condition and the first image failing to meet the feature point tracking condition;
acquiring, by tracking a feature point of the second marked image, position and attitude parameters of the image captured by the camera relative to the second marked image;
acquiring position and attitude parameters of the image according to the position and attitude parameters of the image relative to the second marked image and position and attitude parameters of each marked image relative to a previous marked image; and
determining a position and an attitude of the camera according to the position and attitude parameters.

2. The method according to claim 1, wherein the acquiring, by tracking a feature point of the second marked image, position and attitude parameters of an image captured by the camera relative to the second marked image comprises:
extracting a plurality of feature points from the second marked image;
obtaining position and attitude parameters of each image relative to a previous image by tracking the plurality of feature points in at least one image captured by the camera; and
determining, according to position and attitude parameters of the second marked image to a second image relative to a previous image, position and attitude parameters of the second image captured by the camera relative to the second marked image.

3. The method according to claim 2, wherein after the determining position and attitude parameters of the second image relative to the second marked image, the method further comprises:
calculating estimated three-dimensional coordinates of each feature point in the second image according to three-dimensional coordinates of the plurality of feature points in the second marked image and the position and attitude parameters of the second image relative to the second marked image;
transforming the estimated three-dimensional coordinates of each feature point in the second image to obtain estimated two-dimensional coordinates of each feature point in the second image; and
deleting any feature point in response to a distance between estimated two-dimensional coordinates of the feature point in the second image and actual two-dimensional coordinates of the feature point in the second image being greater than a preset distance.

4. The method according to claim 1, wherein the acquiring, by tracking a feature point of a first marked image, position and attitude parameters of an image captured by a camera comprises:

acquiring, according to position and attitude parameters of the first marked image relative to an initial marked image and position and attitude parameters of the image relative to the first marked image, the position and attitude parameters of the image by using the following formula:

$$\begin{bmatrix} R\_final & T\_final \\ 0 & 1 \end{bmatrix} = \begin{bmatrix} Rca & Tca \\ 0 & 1 \end{bmatrix} * \begin{bmatrix} R\_old & T\_old \\ 0 & 1 \end{bmatrix};$$

R_final representing a rotation parameter of the image, and Tonal representing a translation parameter of the image;

Rca representing a rotation parameter of the image relative to the first marked image, and Tca representing a translation parameter of the image relative to the first marked image; and R_old representing a rotation parameter of the first marked image relative to the initial marked image, and T_old representing a translation parameter of the first marked image relative to the initial marked image.

5. The method according to claim 1, wherein the acquiring the position and attitude parameters of the image according to the position and attitude parameters of the image relative to the second marked image and position and attitude parameters of each marked image relative to a previous marked image comprises:

acquiring position and attitude parameters of the second marked image relative to an initial marked image according to position and attitude parameters of the second marked image relative to the first marked image and position and attitude parameters of the first marked image relative to the initial marked image; and acquiring, according to position and attitude parameters of the first image relative to the second marked image and the position and attitude parameters of the second marked image relative to the initial marked image, position and attitude parameters of the first image by using the following formula:

$$\begin{bmatrix} R\_final & T\_final \\ 0 & 1 \end{bmatrix} = \begin{bmatrix} Rcl & Tcl \\ 0 & 1 \end{bmatrix} * \begin{bmatrix} R\_old & T\_old \\ 0 & 1 \end{bmatrix};$$

R_final representing a rotation parameter of the first image, and T_final representing a translation parameter of the first image;

Rcl representing a rotation parameter of the first image relative to the second marked image, and Tcl representing a translation parameter of the first image relative to the second marked image; and R_old representing a rotation parameter of the second marked image relative to the initial marked image, and T_old representing a translation parameter of the second marked image relative to the initial marked image.

6. The method according to claim 1, further comprising:
acquiring a number of feature points tracked in the first image; and
determining, in response to the number failing to reach a preset number, that the first image fails to meet the feature point tracking condition.

7. The method according to claim 1, further comprising:
acquiring homogeneous coordinates corresponding to two-dimensional coordinates of any feature point of the first marked image or the second marked image, the homogeneous coordinates being used for representing the two-dimensional coordinates in a three-dimensional form; and
transforming the homogeneous coordinates into corresponding three-dimensional coordinates by using the following coordinate transformation relationship:

$$M = s * \begin{bmatrix} \frac{1}{fx} & 0 & -\frac{cx}{fx} \\ 0 & \frac{1}{fy} & -\frac{cy}{fy} \\ 0 & 0 & 1 \end{bmatrix} * m;$$

M representing the three-dimensional coordinates, m representing the homogeneous coordinates, S representing a depth of a marked image at which the feature point is located, and fx, fy, cx, and cy representing parameters of the camera.

8. The method according to claim 7, further comprising:
calculating, according to a depth of the first marked image and a depth of a feature point of the first marked image in the second marked image, a depth of the second marked image by using the following formula:

$$S_n = d * S_{n-1};$$

$S_n$ representing the depth of the second marked image, d representing the depth of the feature point of the first marked image in the second marked image, and $S_{n-1}$ representing the depth of the first marked image.

9. The method according to claim 1, wherein before the acquiring, by tracking a feature point of a first marked image, position and attitude parameters of an image captured by a camera, the method further comprises:
acquiring the image captured by the camera when no marked image is set; and
determining the captured image as the first marked image in response to a number of feature points extracted from the captured image reaching a preset number.

10. The method according to any one of claim 1, wherein the position and attitude parameters comprise a translation parameter, and the method further comprises:
acquiring a plurality of rotation parameters and corresponding time stamps of the camera through an inertial measurement unit (IMU), and performing interpolation according to the plurality of rotation parameters and the corresponding time stamps to obtain a rotation parameter curve; and
acquiring, as a rotation parameter of the image captured by the camera, a corresponding rotation parameter of a time stamp of the image captured by the camera in the rotation parameter curve.

11. A non-transitory computer readable storage medium, the computer readable storage medium storing a computer program that, when being loaded by a processor, cause the processor to:

acquire, by tracking a feature point of a first marked image, position and attitude parameters of an image captured by a camera;

use a previous image of a first image as a second marked image when the previous image of the first image meets a feature point tracking condition and the first image fails to meet the feature point tracking condition; and acquire, by tracking a feature point of the second marked image, position and attitude parameters of the image captured by the camera relative to the second marked image; and acquire position and attitude parameters of the image according to the position and attitude parameters of the image relative to the second marked image and position and attitude parameters of each marked image relative to a previous marked image, and determine a position and an attitude of the camera according to the position and attitude parameters.

12. The storage medium according to claim 11, wherein the computer program further causes the processor to:

extract a plurality of feature points from the second marked image;

obtain position and attitude parameters of each image relative to a previous image by tracking the plurality of feature points in at least one image captured by the camera; and determine, according to position and attitude parameters of each of the second marked image to a second image relative to a previous image, position and attitude parameters of the second image captured by the camera relative to the second marked image.

13. The storage medium according to claim 11, wherein the computer program further causes the processor to:

acquire position and attitude parameters of the second marked image relative to an initial marked image according to position and attitude parameters of the second marked image relative to the first marked image and position and attitude parameters of the first marked image relative to the initial marked image; and acquire, according to position and attitude parameters of the first image relative to the second marked image and the position and attitude parameters of the second marked image relative to the initial marked image, position and attitude parameters of the first image by using the following formula:

$$\begin{bmatrix} R\_final & T\_final \\ 0 & 1 \end{bmatrix} = \begin{bmatrix} Rcl & Tcl \\ 0 & 1 \end{bmatrix} * \begin{bmatrix} R\_old & T\_old \\ 0 & 1 \end{bmatrix};$$

R_final representing a rotation parameter of the first image, and T_final representing a translation parameter of the first image;

Rcl representing a rotation parameter of the first image relative to the second marked image, and Tcl representing a translation parameter of the first image relative to the second marked image; and R_old representing a rotation parameter of the second marked image relative to the initial marked image, and T_old representing a translation parameter of the second marked image relative to the initial marked image.

14. A smart device, comprising: a processor and a memory, the memory storing one or more computer readable instructions, the computer readable instructions, when executed by the processor, implementing following operations:

acquiring, by tracking a feature point of a first marked image, position and attitude parameters of an image captured by a camera;

using a previous image of a first image as a second marked image when the previous image of the first image meets a feature point tracking condition and the first image fails to meet the feature point tracking condition;

acquiring, by tracking a feature point of the second marked image, position and attitude parameters of the image captured by the camera relative to the second marked image; and acquiring position and attitude parameters of the image according to the position and attitude parameters of the image relative to the second marked image and position and attitude parameters of each marked image relative to a previous marked image, and determining a position and an attitude of the camera according to the position and attitude parameters.

15. The smart device according to claim 14, wherein the instruction, the program, the code set, or the instruction set is loaded and executed by the processor to implement the following operations:

extracting a plurality of feature points from the second marked image;

obtaining position and attitude parameters of each image relative to a previous image by tracking the plurality of feature points in at least one image captured by the camera; and determining, according to position and attitude parameters of each of the second marked image to a second image relative to a previous image, position and attitude parameters of the second image captured by the camera relative to the second marked image.

16. The smart device according to claim 15, wherein the instruction, the program, the code set, or the instruction set is loaded and executed by the processor to implement the following operations:

calculating estimated three-dimensional coordinates of each feature point in the second image according to three-dimensional coordinates of the plurality of feature points in the second marked image and the position and attitude parameters of the second image relative to the second marked image;

transforming the estimated three-dimensional coordinates of each feature point in the second image to obtain estimated two-dimensional coordinates of each feature point in the second image; and deleting any feature point when a distance between estimated two-dimensional coordinates of the feature point in the second image and actual two-dimensional coordinates of the feature point in the second image is greater than a preset distance.

17. The smart device according to claim 14, wherein the instruction, the program, the code set, or the instruction set is loaded and executed by the processor to implement the following operations:

acquiring, according to position and attitude parameters of the first marked image relative to an initial marked image and position and attitude parameters of the image relative to the first marked image, the position and attitude parameters of the image by using the following formula:

$$\begin{bmatrix} R\_final & T\_final \\ 0 & 1 \end{bmatrix} = \begin{bmatrix} Rca & Tca \\ 0 & 1 \end{bmatrix} * \begin{bmatrix} R\_old & T\_old \\ 0 & 1 \end{bmatrix};$$

R_final representing a rotation parameter of the image, and Tonal representing a translation parameter of the image;

Rca representing a rotation parameter of the image relative to the first marked image, and Tca representing a translation parameter of the image relative to the first marked image; and R_old representing a rotation parameter of the first marked image relative to the initial marked image, and T_old representing a translation parameter of the first marked image relative to the initial marked image.

18. The smart device according to claim 14, wherein the instruction, the program, the code set, or the instruction set is loaded and executed by the processor to implement the following operations:

acquiring position and attitude parameters of the second marked image relative to an initial marked image according to position and attitude parameters of the second marked image relative to the first marked image and position and attitude parameters of the first marked image relative to the initial marked image; and acquiring, according to position and attitude parameters of the first image relative to the second marked image and the position and attitude parameters of the second marked image relative to the initial marked image, position and attitude parameters of the first image by using the following formula:

$$\begin{bmatrix} R\_final & T\_final \\ 0 & 1 \end{bmatrix} = \begin{bmatrix} Rcl & Tcl \\ 0 & 1 \end{bmatrix} * \begin{bmatrix} R\_old & T\_old \\ 0 & 1 \end{bmatrix};$$

R_final representing a rotation parameter of the first image, and T_final representing a translation parameter of the first image;

Rcl representing a rotation parameter of the first image relative to the second marked image, and Tcl representing a translation parameter of the first image relative to the second marked image; and R_old representing a rotation parameter of the second marked image relative to the initial marked image, and T_old representing a translation parameter of the second marked image relative to the initial marked image.

19. The smart device according to claim 14, wherein the instruction, the program, the code set, or the instruction set is loaded and executed by the processor to implement the following operations:

acquiring a number of feature points tracked in the first image; and determining, when the number fails to reach a preset number, that the first image fails to meet the feature point tracking condition.

20. The smart device according to claim 14, wherein the instruction, the program, the code set, or the instruction set is loaded and executed by the processor to implement the following operations:

acquiring homogeneous coordinates corresponding to two-dimensional coordinates of any feature point of the first marked image or the second marked image, the homogeneous coordinates being used for representing the two-dimensional coordinates in a three-dimensional form; and transforming the homogeneous coordinates into corresponding three-dimensional coordinates by using the following coordinate transformation relationship:

$$M = s * \begin{bmatrix} \frac{1}{fx} & 0 & -\frac{cx}{fx} \\ 0 & \frac{1}{fy} & -\frac{cy}{fy} \\ 0 & 0 & 1 \end{bmatrix} * m;$$

M representing the three-dimensional coordinates, m representing the homogeneous coordinates, s representing a depth of a marked image at which the feature point is located, and fx, fy, cx, and cy representing parameters of the camera.

* * * * *